A. O. WILLIAMS.
DIFFERENTIAL GEARING.
APPLICATION FILED JUNE 25, 1917.
1,297,954.
Patented Mar. 18, 1919.
2 SHEETS—SHEET 1.
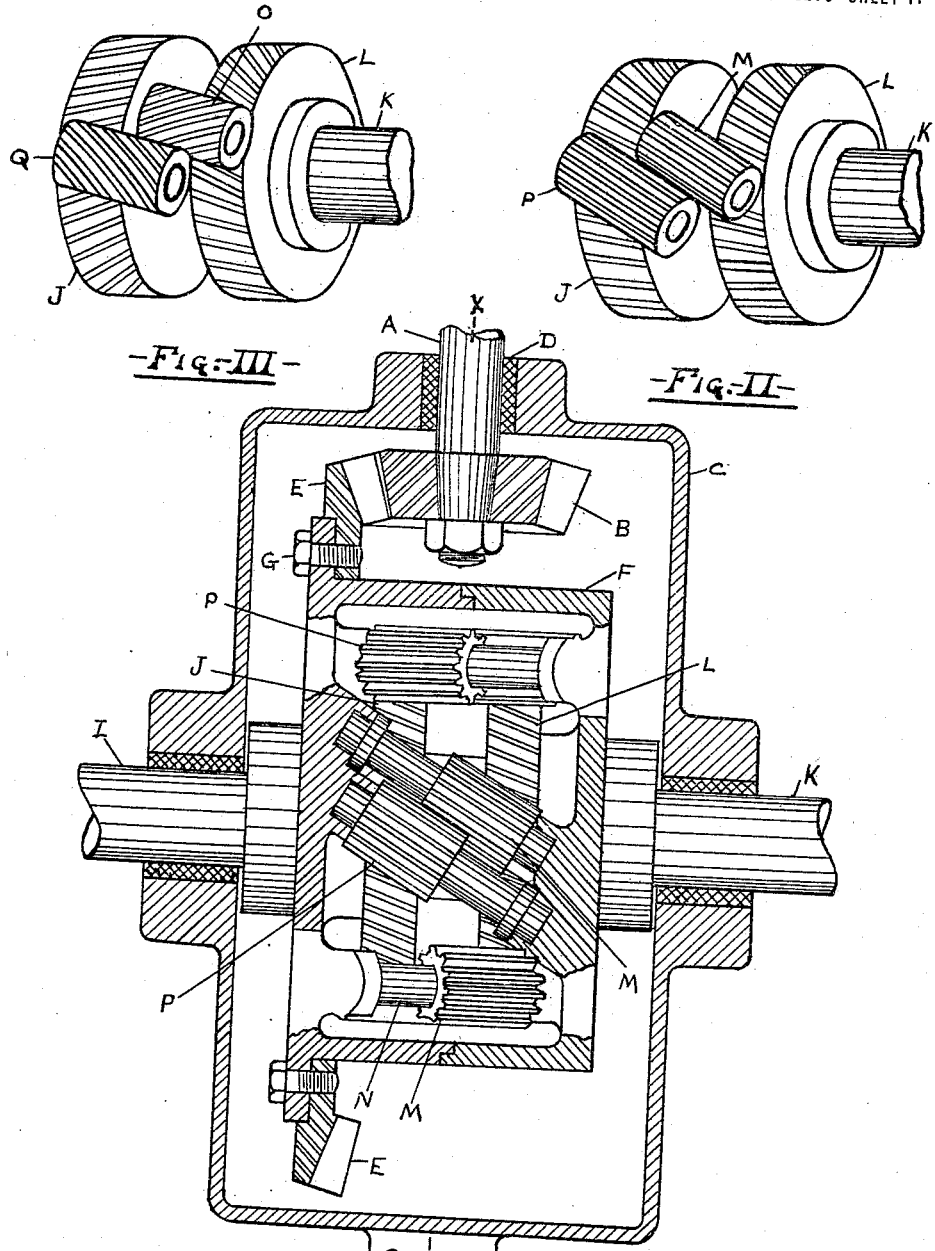
INVENTOR
Alfred Owen Williams
BY
William M. Swan
ATTORNEY

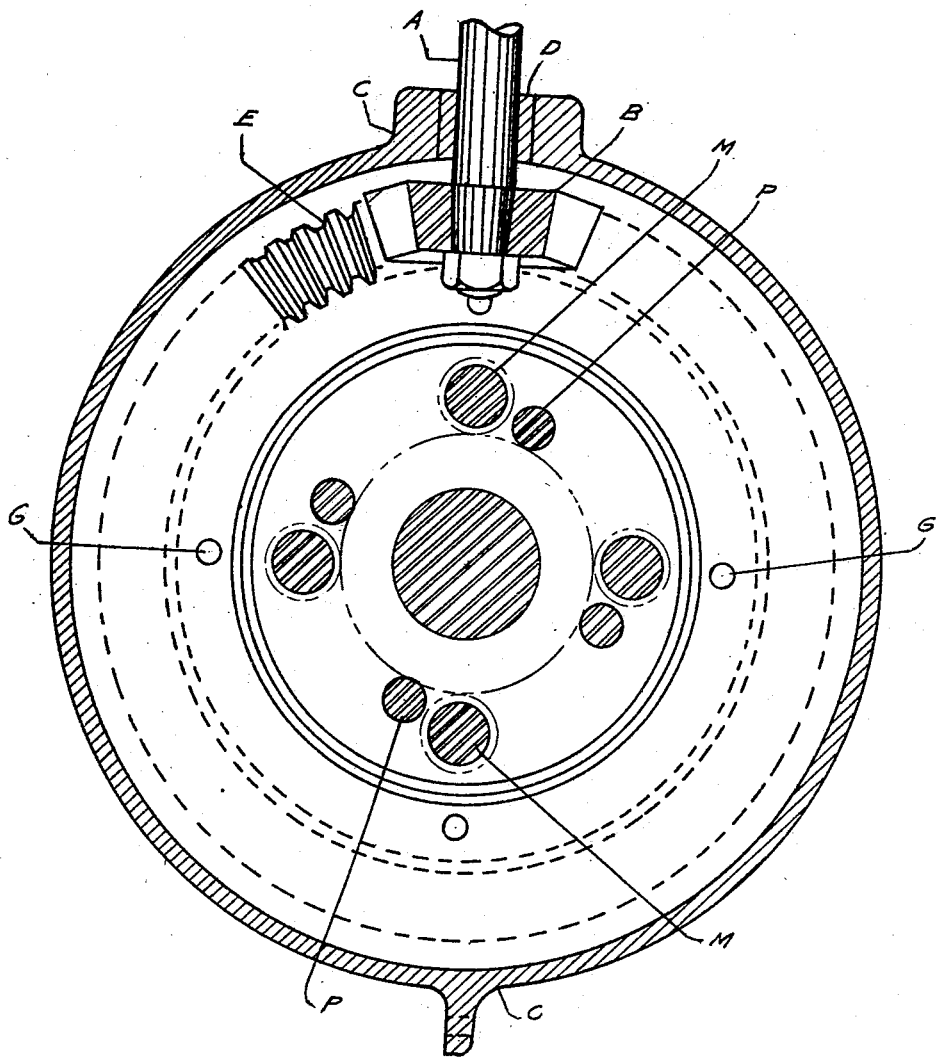

UNITED STATES PATENT OFFICE.

ALFRED OWEN WILLIAMS, OF SOUTH BEND, INDIANA.

DIFFERENTIAL GEARING.

1,297,954.	Specification of Letters Patent.	Patented Mar. 18, 1919.

Application filed June 25, 1917. Serial No. 176,722.

*To all whom it may concern:*

Be it known that I, ALFRED OWEN WILLIAMS, a citizen of the United States, residing at South Bend, county of St. Joseph, State of Indiana, have invented a certain new and useful Improvement in Differential Gearing, and declare the following to be a full, clear, and exact description of the same, such as will enable others skilled in the art to which it pertains to make and use the same, reference being had to the accompanying drawings, which form a part of this specification.

This invention relates to a locking differential construction for motor vehicles, and has for its object an improved construction whereby racing or unequal rotative speed of one traction wheel relative to the other is prevented, when, because of turning a corner or because of one wheel passing through a muddy spot on the road, the traction conditions on the two driving wheels are not equal.

In the drawings:

Figure 1 shows my differential construction largely in section.

Fig. 2 is a perspective of the interlocking gear wheels shown in the central portion of Fig. 1, no attempt being made to show the surrounding parts.

Fig. 3 is a similar showing to that of Fig. 2, but with the smaller gear wheels provided with spiral rather than straight teeth.

Fig. 4 is a sectional elevation, with the driving shaft and gear shown in full elevation, along the line $x-x$, of Fig. 1.

A represents the driving shaft of a motor vehicle, whose end, entering the casing C through the bushing D, carries the driving pinion B. The teeth of this driving pinion engage the teeth of the ring gear E, which may, if desired, be detachably connected to the housing F of the differential by means of bolts G. At I and K are shown the inner ends of the divided rear axle, which carry within the casing C the gear wheels J and L respectively. Rotatively supported on studs within the differential housing are detent gear members M, of which I have shown four, although there may be any number from one to five, dependent upon the power to be transmitted through, and the size of, the differential. Adjacent to each of these gear members M is a detent gear wheel P, whose teeth are in engagement with those of its corresponding gear wheel M. The teeth of each gear wheel M mesh with those on the rear axle gear wheel L, whereas the teeth on each of the wheels P mesh with the teeth on the rear axle gear wheel J. In the form shown in Figs. 1 and 2, the teeth on the gear wheels M and P are straight, whereas in Fig. 3 the corresponding small gear wheels O and Q have spirally disposed teeth.

In ordinary running, where traction conditions on the two wheels are the same, the rotation of the shaft A is communicated to the differential casing F, and by it transmitted to the rear axle gear members J and L equally, consequently causing no relative movement of one with respect to the other. When, however, such unequal traction conditions are encountered as turning a corner, or the passage of one wheel through a muddy spot while the traction on the other wheel remains constant, the tendency of the two wheels to rotate at unequal degrees is counteracted by the fact that, while the gear L, for instance, can cause a rotation of each of the small gears M, these gears in turn cannot cause a correspondingly rapid rotation of the intermeshing gears P, because these in turn are in mesh with the teeth of the other rear axle gear wheel J. Whether anything short of full locking takes place is dependent upon the angle at which the gear members M and P are mounted, this in turn being determined by the slant of the teeth of the various sets of gear wheels. As usual the rear axle gear wheels J and L may be secured to their axle members I and K by means of splines, keys, squaring of the shafts, or in any other desired manner.

What I claim is:

1. In a differential gearing, the combination of a casing, a pair of axially alined driven axle sections, gear wheels fixed to the adjacent inner ends of said driven axle sections, a plurality of pairs of intermeshing detent wheels rotatably journaled within said casing in positions of axial obliquity with respect to the axes of said driven axle sections, the members of each pair being in engagement with one or the other of said driven axle gear wheels, and a driving shaft operatively connected with said casing.

2. A differential gearing, having in combination a shell provided with means for operatively receiving rotative actuation from a power shaft, a pair of coaxially disposed driven axle members rotatably journaled therein, a gear wheel mounted on the inner end of each of said driven axle members, and pairs of spiral detent gear wheels rotatably journaled within the shell obliquely with respect to said driven axle members, the component members of each pair being in operative engagement with one another and with one or the other of said driven axle gear wheels.

In testimony whereof, I sign this specification in the presence of two witnesses.

ALFRED OWEN WILLIAMS.

Witnesses:
WILLIAM M. SWAN,
HARRY F. McMASTER.

Copies of this patent may be obtained for five cents each, by addressing the "Commissioner of Patents, Washington, D. C."